United States Patent [19]

Herbst et al.

[11] Patent Number: 5,458,676
[45] Date of Patent: Oct. 17, 1995

[54] PRESSURE DIFFERENTIAL CONTROL VALVE FOR COMPRESSED AIR SYSTEM

[75] Inventors: Robert J. Herbst, Avon; Duane R. Johnson, Wellington, both of Ohio

[73] Assignee: AlliedSignal Truck Brake Systems Company, Elyria, Ohio

[21] Appl. No.: 234,902

[22] Filed: Apr. 28, 1994

[51] Int. Cl.[6] .................... B01D 53/04; B01D 53/26
[52] U.S. Cl. .................... 96/109; 96/116; 96/144
[58] Field of Search .................... 95/122; 96/108, 96/109, 115, 116, 130, 133, 144

[56] References Cited

U.S. PATENT DOCUMENTS

| | | | |
|---|---|---|---|
| 2,955,673 | 10/1960 | Kennedy et al. | 96/144 X |
| 3,324,631 | 6/1967 | Kreuter | 96/130 X |
| 3,454,186 | 9/1969 | Hankison et al. | 96/115 |
| 3,572,008 | 3/1971 | Hankison et al. | 95/122 X |
| 3,659,399 | 5/1972 | Kauer, Jr. et al. | 95/122 X |
| 3,714,763 | 2/1973 | Suzuki | 96/144 X |
| 3,775,946 | 12/1973 | Brazzel | 96/144 X |
| 3,778,967 | 12/1973 | Kauer, Jr. et al. | 95/122 X |
| 4,331,457 | 5/1982 | Mörner | 96/116 |
| 4,685,941 | 8/1987 | Sato | 96/144 X |
| 4,755,196 | 7/1988 | Frania et al. | 96/116 |
| 4,764,189 | 8/1988 | Yanagawa et al. | 96/144 X |
| 4,955,994 | 9/1990 | Knight et al. | 96/144 X |
| 5,145,495 | 9/1992 | Elamin | 96/115 X |
| 5,209,764 | 5/1993 | Eberling | 96/130 X |

FOREIGN PATENT DOCUMENTS

| | | | |
|---|---|---|---|
| 0405073 | 1/1991 | European Pat. Off. | 96/144 |
| 0530019 | 3/1993 | European Pat. Off. | 96/115 |
| 3534161 | 4/1987 | Germany | 95/122 |
| 46-023601 | 7/1971 | Japan | 96/109 |
| 54-136575 | 10/1979 | Japan | 96/144 |
| 02-068113 | 3/1990 | Japan | 96/144 |
| 0969306 | 11/1982 | U.S.S.R. | 96/115 |
| 1261697 | 10/1986 | U.S.S.R. | 96/115 |

*Primary Examiner*—Robert Spitzer
*Attorney, Agent, or Firm*—Leo H. McCormick, Jr.

[57] ABSTRACT

A compressed air system includes an air dryer which dries compressed air before the compressed air is communicated to a reservoir. The air dryer includes a desiccant which is purged by using air stored in the reservoir. A pressure reference purge control valve is installed between the air dryer and the reservoir and includes a housing which defines a pressure reference volume. A pressure which is a function of the highest pressure level communicated to the reservoir is trapped in the reference volume. The valve permits purging only until a pressure is reached which is a predetermined pressure drop below the reference pressure level, whereupon purging is terminated.

18 Claims, 2 Drawing Sheets

PRESSURE DIFFERENTIAL CONTROL VALVE FOR COMPRESSED AIR SYSTEM

This invention relates to a compressed air system including an air dryer, and a pressure differential control valve used in such a system.

Compressed air systems are commonly used to operate the brakes of heavy duty vehicles, and operate other vehicle accessories (such as fan clutches). Compressed air systems also may be used with industrial machines. Compressed air systems commonly include an air dryer containing a desiccant material which removes the moisture entrained in the compressed air before the compressed air is stored in a reservoir. The desiccant used in air dryers must be periodically purged of its moisture by backflowing a quantity of compressed air through the desiccant and discharging the air to atmosphere. Prior art air dryers commonly included an integral purge volume within the air dryer housing in which a quantity of compressed air was kept segregated for use in purging. Of course, the integral purge volume substantially increases the size of the air dryer, thereby making installation on some vehicles difficult. Alternatively, some air dryers use a remote mounted purge volume, in which a canister separate from the system reservoirs is mounted remote from the air dryer and is connected thereto by a separate air line. A remote purge volume substantially increases system cost, because of the cost of the added component, and also because the remote purge volume makes installation of the air dryer on a vehicle more complex and time consuming.

In general, the air stored in the reservoir is not used for purging, because the purge control valve on air dryers is open to atmosphere for a substantial time period, which would cause the pressure level in the reservoir to be depleted to an unacceptable level. Although it has been proposed that pneumatic and/or electrical timers be used to limit the amount of air taken from a storage reservoir during purging, each of these proposed devices has practical difficulties. Limiting the length of time that air is taken from a reservoir is generally not a satisfactory solution to the problem because the amount of compressed air passing through the system during a purge cycle of a given period of time varies depending on several factors, including the reservoir volume, the pressure level to which the reservoir was initially charged (which may vary substantially), the size of the orifice through which the purge air is communicated when the desiccant is purged, etc.

The present invention provides a control valve located between the air dryer and the storage reservoir which monitors the maximum pressure level in the reservoir during the charging cycle and limits the pressure drop in the reservoir during the purge cycle to a predetermined pressure drop. Accordingly, the prior art integral purge volume and remote purge volumes are eliminated, thereby reducing the size of the air dryer and facilitating its installation, and the difficulty inherent in timing the purge cycle is avoided.

These and other advantages of the present invention will become apparent from the following description, with reference to the accompanying drawings, in which.

Figure 1:
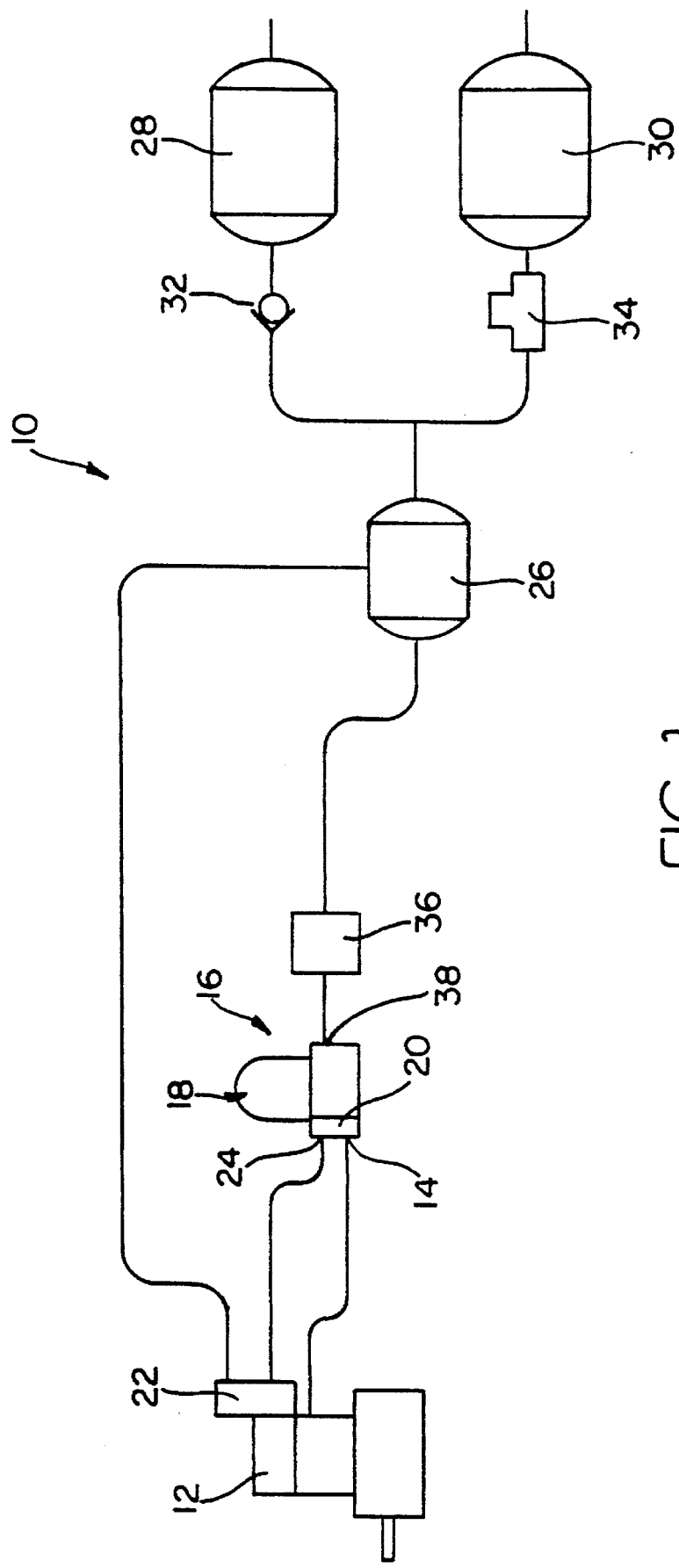
FIG. 1 is a schematic illustration of a compressed air system using the pressure differential control valve made according to the present invention.

Referring now to the drawings, a compressed air system generally indicated by the numeral 10 includes an air compressor 12, which is powered by, for example, the engine of a motor vehicle. The outlet of the air compressor 12 is connected to inlet port 14 of an air dryer generally indicated by the numeral 16, which includes a desiccant canister or bed generally indicated by the numeral 18. Air dryer 16 includes an integral inlet and purge control valve generally indicated by the numeral 20. The valve 20 responds to a pressure signal generated by a governor 22 which is mounted on the air compressor 12. The pressure signal is transmitted to control port 24 of the air dryer 16. When a signal is received at the control port 24, the conventional combination inlet and purge control valve 20 closes off the inlet port 14 and opens the desiccant bed 18 to atmosphere, thereby initiating purging.

The signal transmitted to control port 24 is generated by the governor 22 in response to pressure in reservoir 26 attaining a predetermined level. The governor 22 also disables the compressor 12 when the pressure level in reservoir 26 attains the predetermined level, normally by holding open the inlet valves of the compressor. Alternatively, the governor 22 disables the compressor 12 by operating a pressure responsive clutch which disconnects compressor 12 from the engine. The governor 22 enables the compressor, and terminates the signal to control port 24 thereby terminating the purge cycle, when the pressure in reservoir 26 drops to a predecided pressure level, which is lower than the predetermined pressure level. The reservoir 26 charges primary reservoir 28 and secondary reservoir 30. Primary reservoir 28 is protected by a conventional check valve 32, and reservoir 30 is protected by pressure control feedback check valve generally indicated by the numeral 34. Check valve 34 is a known check valve which allows back flow of air down to a predetermined pressure, then checks off.

A pressure differential control valve 36 is located between outlet port 38 of air dryer 16 and the reservoir 26. Pressure differential control valve 36 closes communication between the reservoir 26 and the outlet port 38 of air dryer 16 during purging when the pressure level in reservoir 26 drops a predetermined amount below the maximum pressure level attained in the reservoir 26 during the charging cycle. This pressure drop is less than the pressure drop between the aforementioned predetermined and predecided pressure levels, so that purging of the air dryer 16 is terminated well before the compressor 12 is enabled in response to the pressure in reservoir 26 dropping below the predecided pressure level. The pressure drop permitted by valve 36 is sufficient to permit complete purge of the desiccant 18, but is small enough so that the air pressure in the reservoir 26 is conserved.

Figure 2:
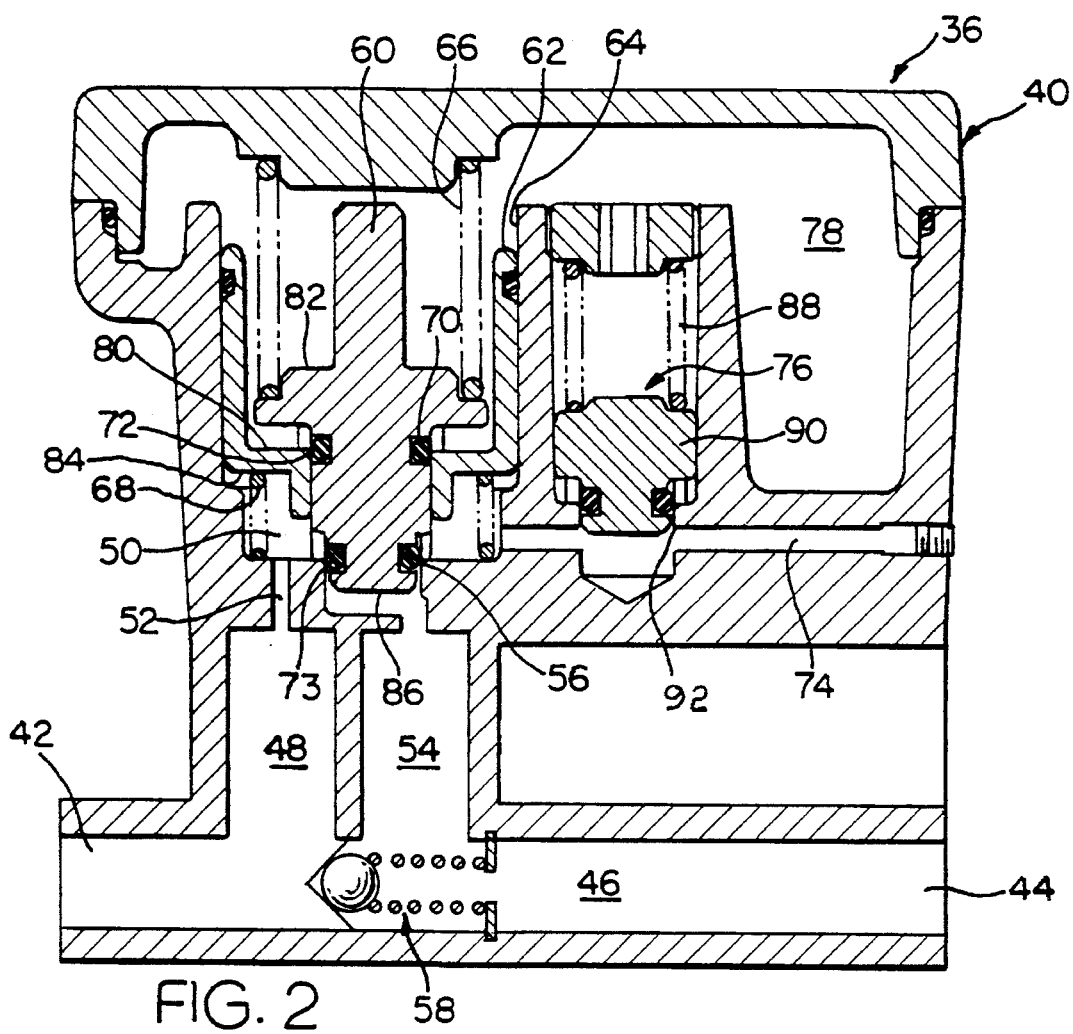
FIG. 2 is a cross-sectional view of the pressure differential control valve used in the system of FIG. 1.

Referring now to FIG. 2, the valve 36 includes a housing 40 having a port 42 connected to port 38 of the air dryer 16 and a port 44 which is connected to the reservoir 26. A bypass passage 46 communicates the port 42 with the port 44. A branch passage 48 communicates the port 42 to a cavity 50 through a flow restricting orifice 52. Another branch passage 54 communicates the port 44 to the cavity 50 through a valve seat 56. A check valve illustrated at 58 is located in the bypass passage 46 between the branches 48 and 54 and permits communication from the port 42 to the port 44, but prevents communication in the reverse direction. A pair of coaxial valve pistons comprising inner piston 60 and outer piston 62 are slidably mounted in bore 64 defined within the housing 40. Opposite acting springs 66, 68, bear against respectively the pistons 60 and 62. Piston 60 carries a circumferentially extending seal 70 which cooperates with seating area 72 on the piston 62 to define a pair of mutually cooperating valve seats which are sealingly engaged with one another when the pistons 60, 62 are urged in the positions illustrated in FIG. 2 by the springs 66 and 68. The piston 60 further carries a circumferentially extending seal 73 which is held in sealing engagement with the seat 56 by the spring 66 in the absence of a pressure differential across the piston 60. Accordingly, when the seal 73 engages the seat 56, communication between the branch 54 and the cavity 50 is prevented.

The cavity 50 communicates with a passage 74, which communicates through a one-way valve generally indicated by the numeral 76 to a reference pressure volume 78 defined within the housing 40. Accordingly, pressure communication is permitted from the cavity 50 into the reference volume 78 through the one-way valve 76, but communication in the reverse direction is prevented. The upper faces (viewing FIG. 2) 80, 82 of the pistons 62 and 60 respectively are exposed to the pressure level in the reference volume 78. The face 84 of piston 62 opposite the face 80 is exposed to the pressure level in the cavity 50, while the face 86 of the piston 60 opposite the face 82 is exposed to the pressure level in the branch 54 when the seal 73 is in sealing engagement with the seat 56.

In operation, during charging of the reservoir 26, compressed air communicates from air dryer 18 through the bypass passage 46 from the port 42 to the port 44. Pressure also communicates through the orifice 52 into the cavity 50. The pressure in bypass passage 46 also acts against the face 86 of the piston 60. When the combined force of the pressure in cavity 50 acting against face 84 and the pressure acting against face 86 is sufficient to overcome the differential force of the springs 66, 68, pistons 60 and 62 move upwardly, thereby permitting communication through the valve seat 56 into the passage 74. The one-way check valve 76 includes a spring 88 which holds a piston 90 in sealing engagement with valve seat 92. When the pressure in passage 74 is sufficient to overcome the force of spring 88, piston 90 moves upwardly, permitting the pressure in passage 74 to communicate into the reference volume 78. Depending upon the force of the spring 88, the pressure trapped in reference volume 78 will be less than, but a direct function of, the pressure at port 44. When pressure in bypass passage 46 and at port 44 increases, this pressure increase will be communicated to the reference volume 78, but the one-way valve 76 prevents loss of pressure from the reference volume 78 in response to a decrease of pressure in bypass passage 46 and cavity 50. Accordingly, the pressure trapped in reference volume 78 will be a direct function of the maximum pressure communicated to the reservoir 26.

When the governor 22 senses that the pressure in reservoir 26 has attained the predetermined pressure level, the governor 22 generates a signal unloading the compressor 12 and also communicates a control signal to control port 24 of air dryer 16, thereby causing the valve 20 to close the inlet port and open the desiccant bed 18 to atmosphere, thereby initiating purging of the desiccant bed. When this occurs, pressure communicates from the reservoirs 26 and 30, through the port 44, the branch 54, the cavity 50, the purge orifice 52, the branch 48, and out of the port 42 to purge the desiccant bed 18 in a manner well known to those skilled in the art. As the pressure in the reservoirs 26 and 30 drops, the pressure in port 44, the bypass passage 46, and the cavity 50 will drop, accordingly the pressure in passage 74 will also drop. However, the pressure trapped in reference volume 78 remains constant. As the air dryer is purged, the forces acting on the faces 86 and 84 of the pistons 60 and 62 will continually drop. When the force exerted on the pistons 60, 62 by the pressure acting on the faces 86 and 84 drops below the differential force of the springs 66, 68 plus the force of the pressure in the reference volume 78 acting against the faces 82 and 80, the pistons 60 and 62 will be urged downwardly until the seal 73 again engages the seat 56, thereby ending the purge cycle and preventing further drop in pressure in the reservoirs 26 and 30. Since the desiccant bed 18 is open to atmospheric pressure, pressure in cavity 50 will continue to drop, until the force of the reference pressure trapped in reference volume 78 overcomes the force of spring 68, thereby urging the piston 62 downwardly viewing FIG. 2 relative to the piston 60, and opening the valve seat 72 from the seal 70. Accordingly, the reference pressure trapped in reference volume 78 is exhausted to atmosphere through the desiccant bed 18, and the spring 68 thereafter returns the piston 62 to the position illustrated in FIG. 2. Accordingly, even though the pressure in reservoir 26 has not yet reached the predecided pressure level and the valve 20 is still open venting the desiccant bed 18 to atmosphere, no further decrease in pressure in reservoirs 26 and 30 is permitted through port 44.

Figure 3:
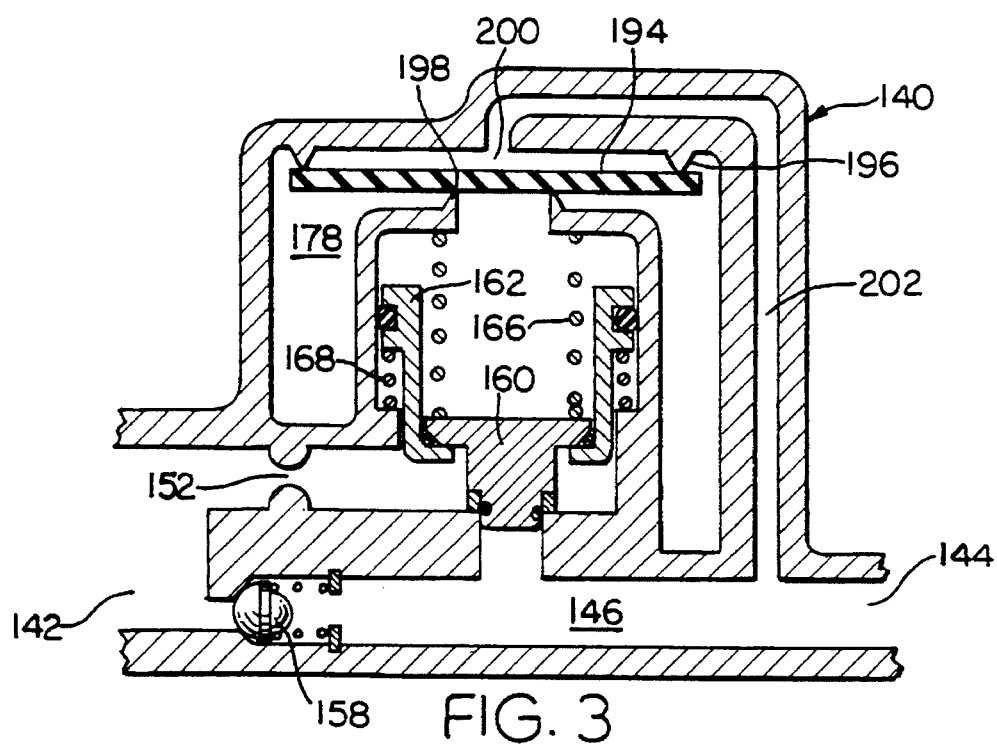
FIG. 3 is a cross-sectional view similar to FIG. 2 but illustrating an alternate embodiment of the invention.

Referring now to the alternate embodiment of FIG. 3, elements the same or substantially those in the embodiment of FIG. 2 retain the same reference numeral, but increased by 100. In the embodiment of FIG. 3, the one-way valve assembly 76 is replaced by a dual area diaphragm 194, which acts against an outer valve seat 196 and an inner valve seat 198. Pressure at port 144 in the bypass passage 146 is communicated to upper chamber 200 through passage 202. Accordingly, the diaphragm 194 is forced into sealing engagement with the valve seat 198, but the outer periphery of the diaphragm 194 is deflected off of the valve seat 196, to permit pressure communicated through passage 202 to enter the reference volume 178. When the pressure in passage 202 drops below the pressure trapped in reference volume 178, the diaphragm is urged into sealing engagement with seat 196. The embodiment of FIG. 3 operates in the same way as that of FIG. 2 during the purge cycle.

We claim:

1. Compressed air system comprising a reservoir, an air compressor for generating compressed air for charging said reservoir, means for disabling said air compressor when the pressure level in said reservoir attains a predetermined level and enabling said air compressor when the pressure level in said reservoir drops below a predecided level, an air dryer connected between said air compressor and said reservoir, said air dryer including a desiccant bed for removing moisture from said compressed air and control means responsive for disabling of said air compressor by disconnecting said desiccant bed from said air compressor and connecting said desiccant bed to atmosphere whereby compressed air back flows from said reservoir through said desiccant bed to atmosphere purges said desiccant, and purge control valve means between said desiccant bed and said reservoir for limiting the pressure drop in said reservoir to a predetermined pressure drop during purging of said desiccant bed, said purge control valve including a housing having a reference pressure volume, a flow restricting purge orifice and a passage bypassing said purge orifice to permit direct communication of compressed air from the air compressor to the reservoir when the air compressor is enabled, and a check valve in said bypass passage permitting communication through said bypass passage to said reservoir but preventing communication in the reverse direction, and pressure responsive means including control means for controlling communication into said volume and for trapping a reference pressure in said reference pressure volume which is a predetermined function of the pressure level in the reservoir when the compressor is disabled and for permitting communication through said orifice from said reservoir to said desiccant bed when the compressor is disabled.

2. Compressed air system as claimed in claim 1, wherein said predecided pressure level is less than the predetermined pressure level, said pressure drop permitted by the purge control valve means being less than the difference between the predetermined pressure level and the predecided pressure level.

3. Compressed air system as claimed in claim 2, wherein said purge control valve includes means for trapping a reference pressure which is a predetermined function of the pressure level in the reservoir when the compressor is disabled.

4. Compressed air system as claimed in claim 1, wherein said pressure responsive means includes valve means controlling communication between said bypass passage and said reference volume, said valve means including means for permitting communication between said bypass passage and the reference volume when the compressor is enabled to thereby establish said pressure level in the reference volume that is a predetermined function of the pressure level in the reservoir when the compressor is enabled, said valve means trapping said pressure level in the reference volume when the compressor is disabled.

5. Compressed air system as claimed in claim 4, wherein said valve means is a piston, and a spring biasing said piston against a valve seat.

6. Compressed air system as claimed in claim 4, wherein said valve means is a dual area diaphragm.

7. Compressed air system as claimed in claim 4, wherein said pressure responsive means includes means for venting said reference pressure to said desiccant bed when the pressure drop in said reservoir when said compressor is disabled attains said predetermined pressure drop.

8. Compressed air system as claimed in claim 4, wherein said pressure responsive means includes a primary pressure responsive member responsive to the pressure level in said reservoir and in said reference volume, said primary pressure responsive member controlling communication from said reservoir through said orifice when the compressor is disabled, said primary pressure responsive member comparing the pressure in the reservoir and the pressure in the reference volume to open communication through said orifice when the pressure drop in said reservoir is less than the predetermined pressure drop and closing communication through said orifice when the pressure drop in said reservoir attains the predetermined pressure drop.

9. Compressed air system as claimed in claim 8, wherein said pressure responsive means includes a secondary pressure responsive member, said secondary pressure responsive member being responsive to the pressure level in the reference volume to vent said reference volume to said desiccant bed in response to closing of communication through said orifice by said primary pressure responsive member.

10. Compressed air system as claimed in claim 9, wherein said primary and secondary pressure responsive members are coaxial pistons.

11. Compressed air system as claimed in claim 9, wherein said primary and secondary pressure responsive members are coaxial pistons, said coaxial pistons defining mutually cooperating valve seats, and a pair of oppositely acting springs acting on said pistons, said coaxial pistons moving conjointly to control communication through said orifice, said coaxial piston comprising said secondary pressure responsive member moving relative to the other coaxial piston after communication through said orifice is closed to open said mutually cooperating valve seats to vent the reference volume to said desiccant bed.

12. Pressure differential control valve comprising a housing having a pair of ports, a pair of passages, each of said passages communicating one of said ports with the other port, a check valve in one of the passages permitting communication from said one port to the other port but preventing communication in the reverse direction, a flow restricting orifice in the other passage, said housing defining a reference pressure volume, and pressure responsive means for establishing a pressure level in said reference pressure volume which is a predetermined function of the pressure level at the other port during communication of fluid pressure from said one port to said other port through said one passage and controlling communication through said other passage from said other port to said one port as a function of the pressure level in the reference pressure volume when the pressure level at the one port is less than the pressure level at the other port.

13. Pressure differential control valve as claimed in claim 12, wherein said pressure responsive means includes valve means controlling communication between said one passage and said reference volume, said valve means including means for permitting communication between said one passage and the reference volume but preventing communication in the reverse direction.

14. Pressure differential control valve as claimed in claim 13, wherein said valve means is a piston, and a spring biasing said piston against a valve seat.

15. Pressure differential control valve as claimed in claim 13, wherein said valve means is a dual area diaphragm.

16. Pressure differential control valve as claimed in claim 13, wherein said pressure responsive means includes a primary pressure responsive member responsive to the pressure level at said other port and in said reference volume, said primary pressure responsive member controlling communication from said other port through said orifice when the pressure level at said one port is less than the pressure level at the other port, said primary pressure responsive member comparing the pressure at the other port and the pressure in the reference volume to open communication through said orifice when the pressure drop at the other port is less than the predetermined pressure drop and closing communication through said orifice when the pressure drop at the other port attains the predetermined pressure drop.

17. Pressure differential control valve as claimed in claim 16, wherein said pressure responsive means includes a secondary pressure responsive member, said secondary pressure responsive member being responsive to the pressure level in the reference volume to vent said reference volume to said one port in response to closing of communication through said orifice by said primary pressure responsive member.

18. Pressure differential control valve as claimed in claim 17, wherein said primary and secondary pressure responsive members are coaxial pistons, said coaxial pistons defining mutually cooperating valve seats, and a pair of oppositely acting springs acting on said pistons, said coaxial pistons moving conjointly to control communication through said orifice, said coaxial piston comprising said secondary pressure responsive member moving relative to the other coaxial piston after communication through said orifice is closed to open said mutually cooperating valve seats to vent the reference volume to said one port.

\* \* \* \* \*